July 1, 1958 H. S. GLEASON 2,841,461

APPARATUS FOR MAGNETIC PRINTING

Filed July 26, 1952 8 Sheets-Sheet 1

INVENTOR.
HOWARD S. GLEASON

BY T. L. Bowes

ATTORNEY

July 1, 1958 H. S. GLEASON 2,841,461

APPARATUS FOR MAGNETIC PRINTING

Filed July 26, 1952

8 Sheets-Sheet 2

INVENTOR.
HOWARD S. GLEASON

BY T. L. Bowes

ATTORNEY

July 1, 1958 H. S. GLEASON 2,841,461

APPARATUS FOR MAGNETIC PRINTING

Filed July 26, 1952 8 Sheets-Sheet 3

INVENTOR.
HOWARD S. GLEASON

BY T. L. Bowes

ATTORNEY

July 1, 1958 H. S. GLEASON 2,841,461

APPARATUS FOR MAGNETIC PRINTING

Filed July 26, 1952 8 Sheets-Sheet 4

INVENTOR.
HOWARD S. GLEASON
BY T. L. Bowes
ATTORNEY

July 1, 1958 H. S. GLEASON 2,841,461

APPARATUS FOR MAGNETIC PRINTING

Filed July 26, 1952 8 Sheets-Sheet 5

INVENTOR.
HOWARD S. GLEASON
BY T. L. Bowes
ATTORNEY

INVENTOR.
HOWARD S. GLEASON
BY T. L. Bowes
ATTORNEY

July 1, 1958 H. S. GLEASON 2,841,461

APPARATUS FOR MAGNETIC PRINTING

Filed July 26, 1952 8 Sheets-Sheet 7

INVENTOR.
HOWARD S. GLEASON
BY T. L. Bowes
ATTORNEY

July 1, 1958 H. S. GLEASON 2,841,461

APPARATUS FOR MAGNETIC PRINTING

Filed July 26, 1952 8 Sheets-Sheet 8

INVENTOR.
HOWARD S. GLEASON
BY T. L. Bowes
ATTORNEY 2,841,461

APPARATUS FOR MAGNETIC PRINTING

Howard S. Gleason, Rochester, N. Y., assignor, by mesne assignments, to General Dynamics Corporation, a corporation of Delaware Application July 26, 1952, Serial No. 301,103

4 Claims. (Cl. 346—74)

My invention relates to a method of, and apparatus for, printing. By "printing" I mean in this specification the transfer of marks or characters from one surface to the surface of a material to be marked or printed, such as paper, cloth, or the like.

Previously known methods of printing include such multiple copy processes as letter-press printing and such character-by-character systems as typewriting. These classes of printing are in general suitable only for particular sorts of work. Thus, letter-press methods are used where many copies must be reproduced, while typewriting is used where relatively few copies are desired.

The traditional methods of printing have one thing in common: they produce results relatively slowly. Letter-press printing, for example, requires long preparation time, while typewriting is limited by the inertia of the moving parts to a comparatively low number of characters per unit of time.

To obviate the objection to the long time required for reproduction by conventional methods, numerous schemes for high speed printing have been proposed. High printing speed is particularly needed, for example, in readout devices for computing machines and in receiving devices for high speed teletype and telegraph work. The high speed printing devices proposed prior to my invention, however, are, in the main, quite complicated. In general, the complication, and therefore the cost, of prior devices appears to be proportional to the printing speed achieved.

It is accordingly an object of my invention to provide a new and useful method and apparatus for printing which is also simple and inexpensive.

It is another object of my invention to provide a method and apparatus capable of achieving extremely high speeds of character reproduction.

It is still another object of my invention to provide a method and apparatus for printing which involves the use of magnetism.

It is a further object of my invention to provide a method and apparatus for printing in which a magnetic medium can be used and reused for printing a given character or group of characters rapidly, but which may be magnetically erased at will.

Broadly speaking, I accomplish these and other objects of my invention by impressing a magnetic image of the pattern to be printed on a magnetic medium; applying a layer of comminuted magnetic material to the magnetic medium, whereby the comminuted magnetic material adheres with much greater density in the image portions of the pattern than in the non-image portions; and bringing the particle-bearing side of the magnetic medium into intimate contact with the material to be printed, such as paper or the like.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which.

Figures 4, 5:
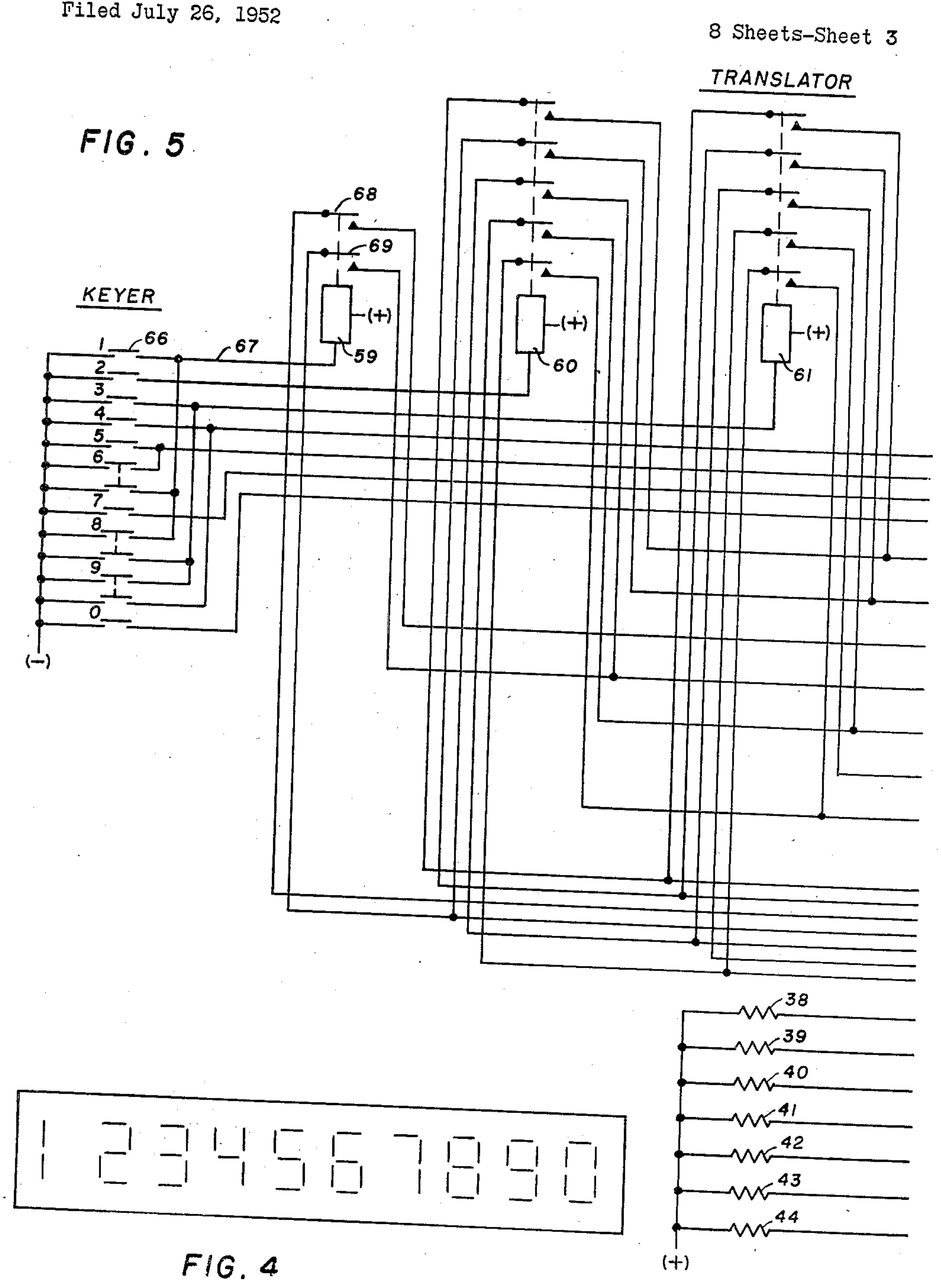
Fig. 4 shows the appearance of numerals printed in accordance with my invention.
Figure 6:
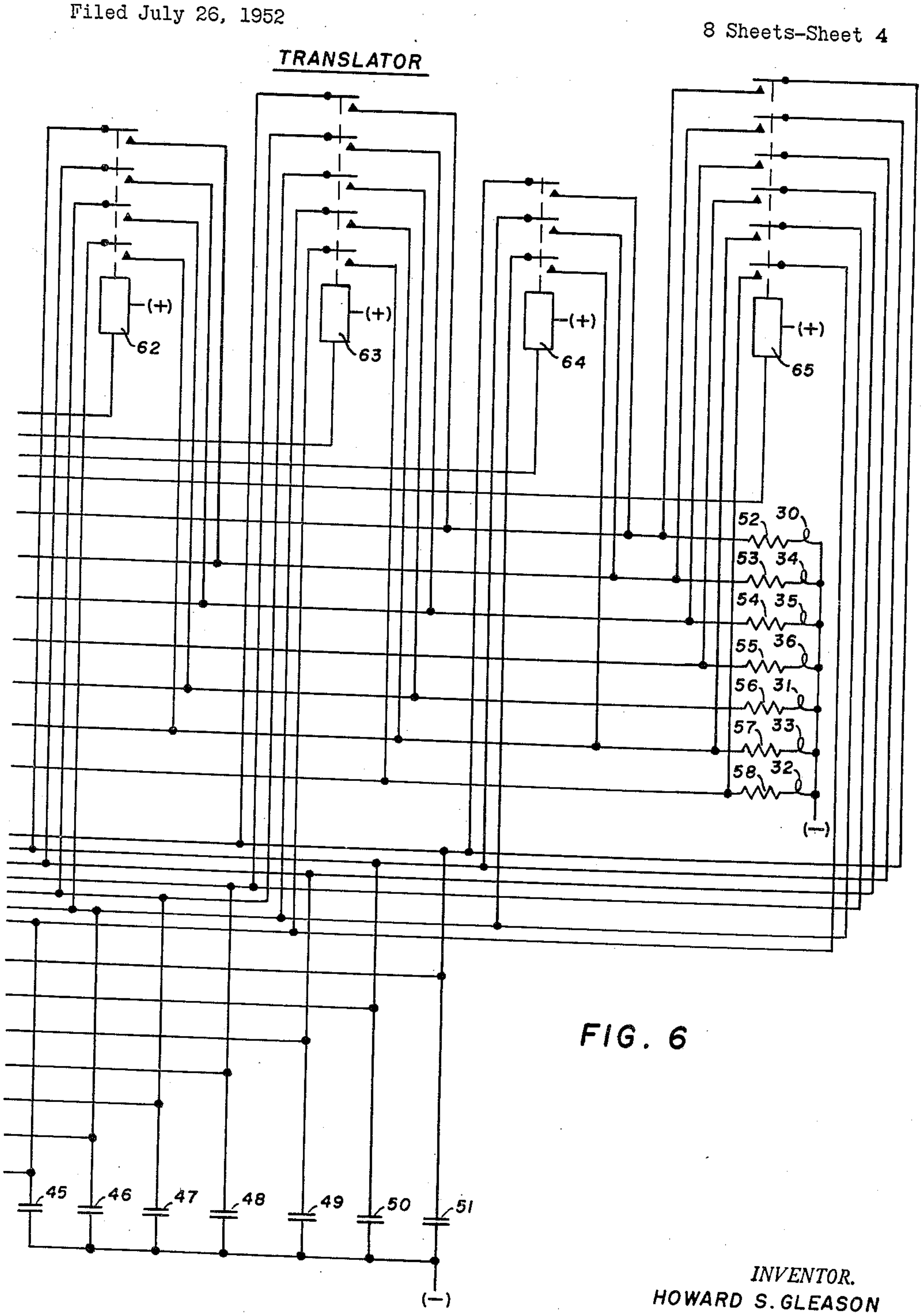
Figure 7:
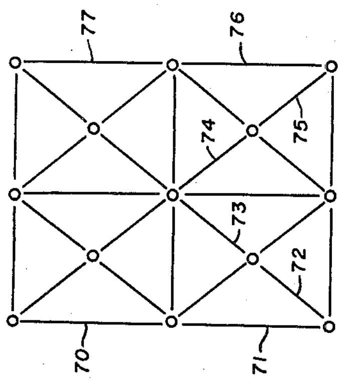
Figure 8:
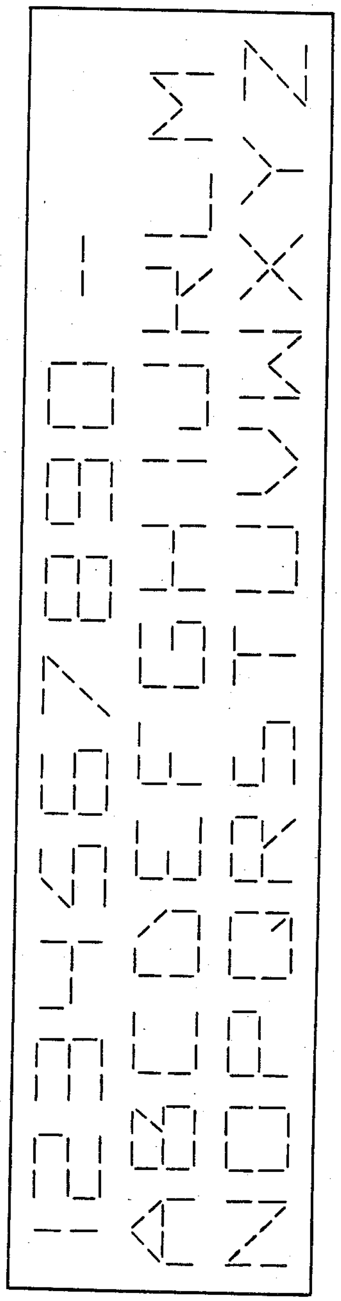
Figure 9:
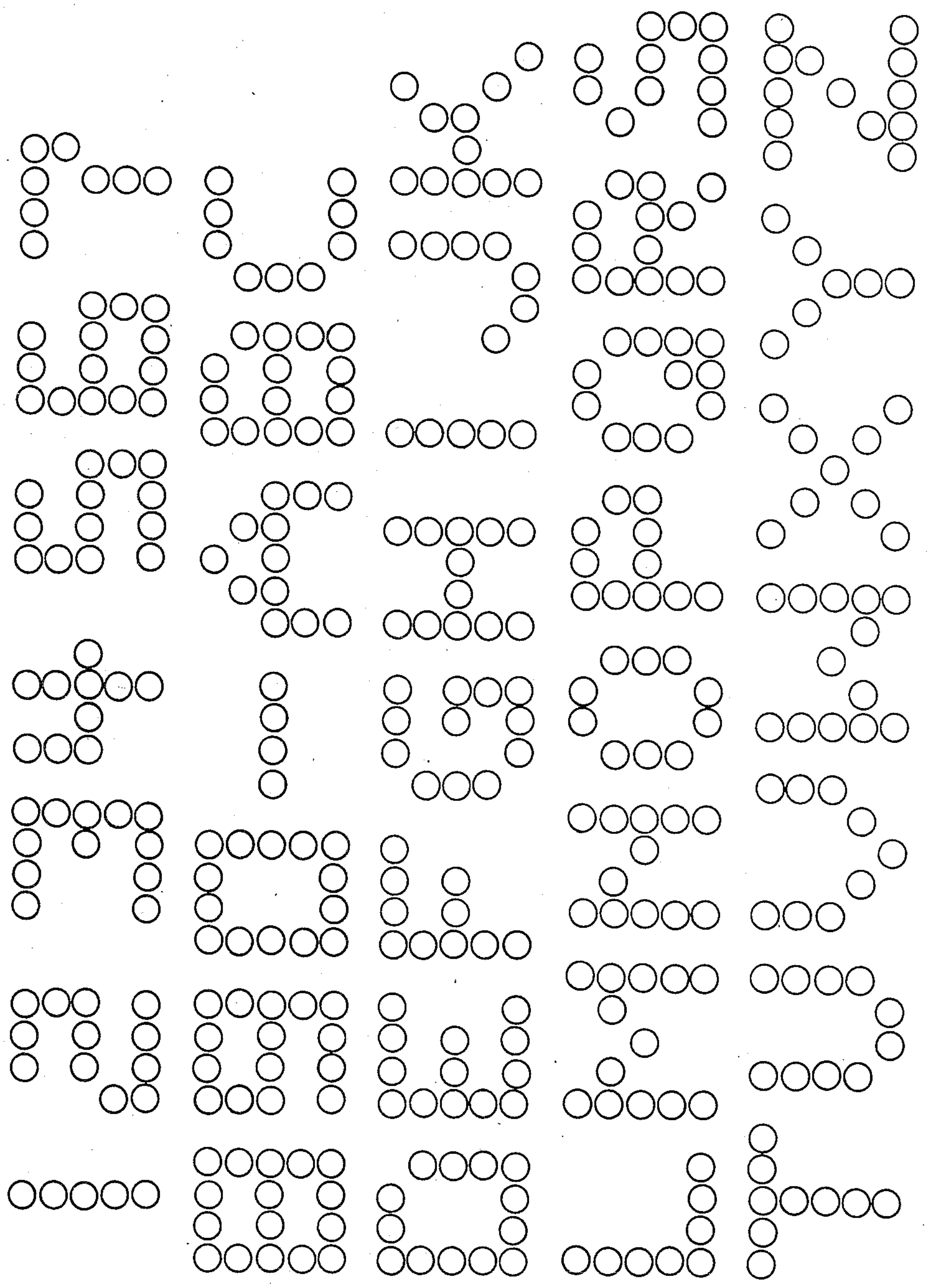
Figure 10:
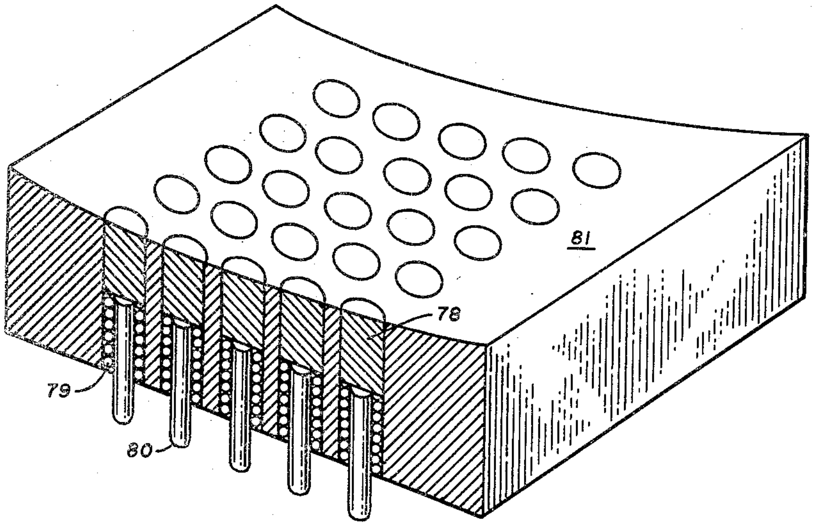
Figure 11:
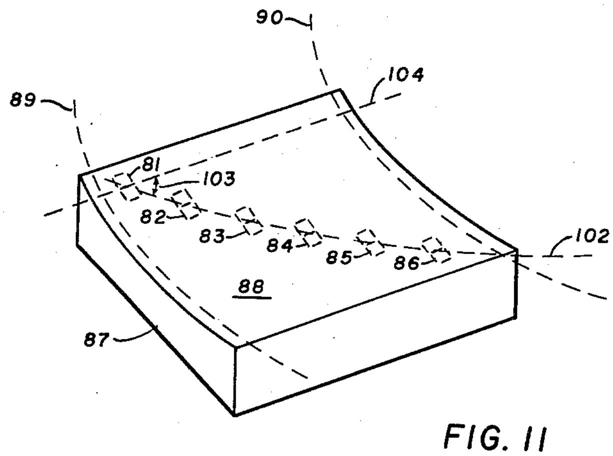
Figure 12:
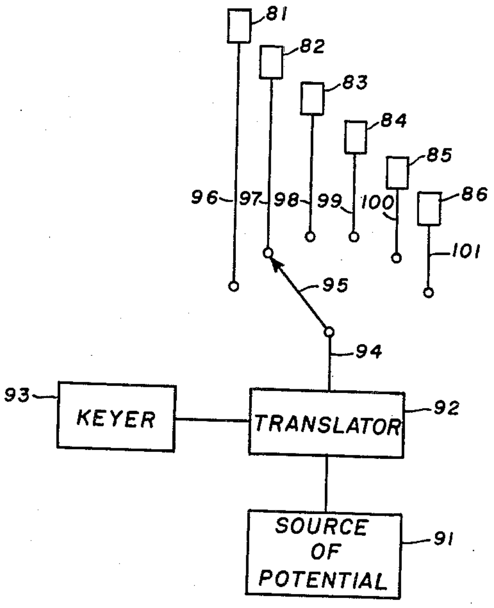

Figs. 5 and 6, taken together with corresponding conductors in alignment, constitute a schematic wiring diagram of a "translator" suitable for use with my invention;

Fig. 7 shows how elements of a multi-element recording head may be arranged to print both Arabic numerals and Roman letters;

Fig. 8 shows the appearance of letters and numerals printed with a recording head like that indicated in Fig. 7;

Fig. 9 shows the appearance of numerals and letters produced by a dot-matrix recording head according to my invention;

Fig. 10 is an isometric, partially broken-away view of a dot-matrix head capable of printing the characters of Fig. 9;

Fig. 11 is an isometric representation of another embodiment of my invention; and Fig. 12 is a block diagram indicating interconnection of parts for the embodiment of Fig. 11.

Figures 1, 1A:
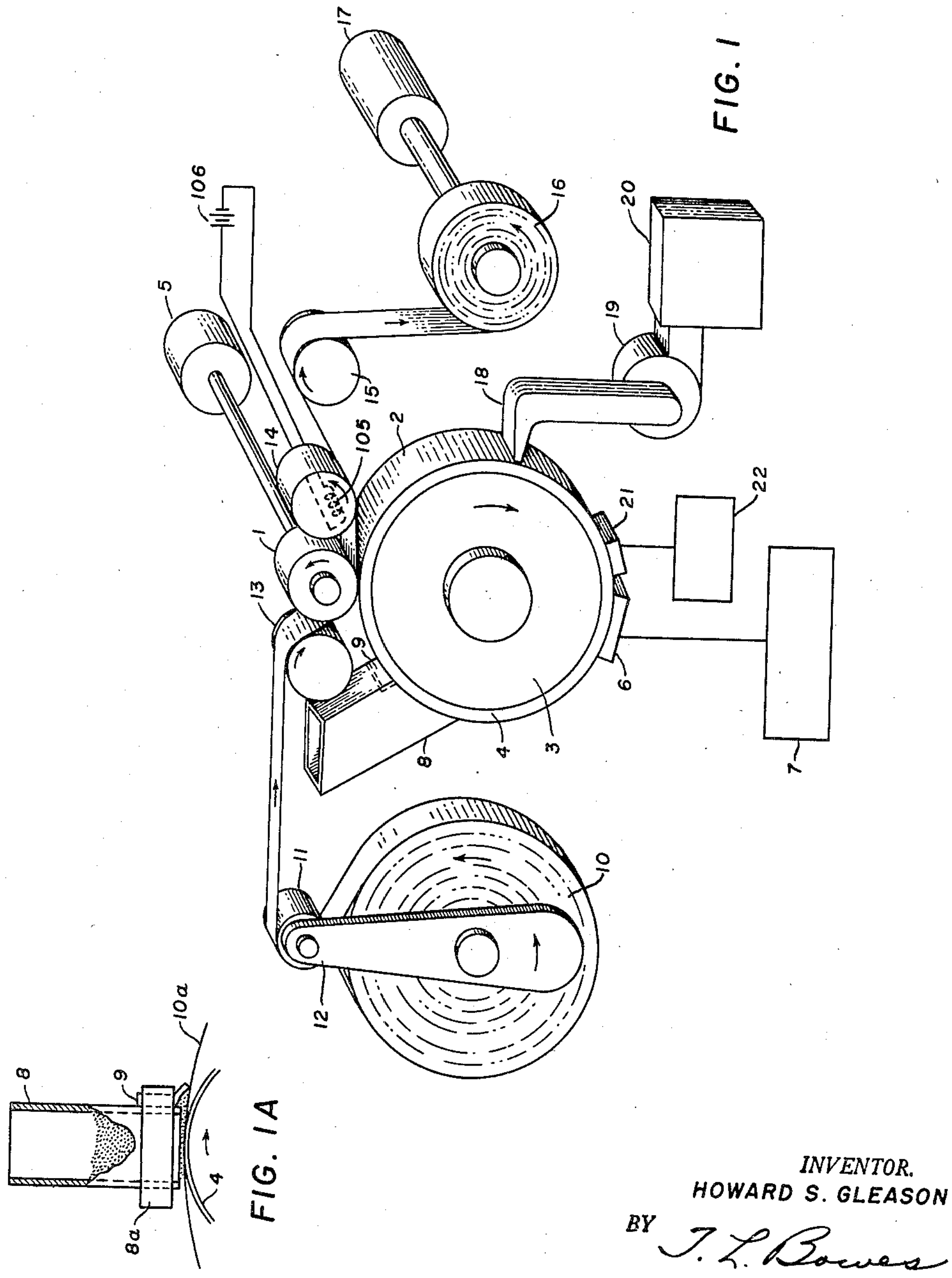
Fig. 1 is a semi-schematic, semi-isometric diagrammatic view of one embodiment of my invention.
Fig. 1A is a detailed view of a modified form of the hopper shown in Fig. 1.

In the embodiment of my invention shown in Fig. 1, a capstan 1 frictionally engages the perimetric, or circumferential, surface 2 of a magnetic drum 3. By "magnetic drum" I mean in this specification that the drum 3 has at least a perimetric portion 4 possessing magnetic characteristics. I prefer that portion 4 of drum 3 be made of permanent magnetic material.

Drum 3 is continuously rotated by capstan 1, which is in turn rotated by suitable driving means, such as capstan motor 5. A magnetic recording head 6 is positioned for recording relative to the perimetric surface 2. Head 6 is energized from a suitable source of potential 7, as will be explained below. The apparatus shown in Fig. 1 may be supported in suitable journals in a framework or standard whose configuration may conveniently and readily be determined by those skilled in the art. Since the particular configuration of support is well within the skill of technicians and in any case is not essential to an understanding of my invention, a detailed explanation thereof is not deemed necessary herein.

In accordance with my invention, I provide a hopper 8 containing comminuted magnetic material. I prefer that this material be a carbonyl iron powder. Carbonyl iron powder is produced by reacting crude iron with carbon monoxide to form iron pentacarbonyl. The iron pentacarbonyl is vaporized, leaving impurities behind. The iron pentacarbonyl is then decomposed to form minute crystals which build up into tiny spheres. I prefer that the average size of these particles be about eight microns in diameter. I have found that a carbonyl iron powder of the following composition ranges produces acceptable results:

| | Percent |
|---|---|
| Iron | 98.1–98.7 |
| Carbon | 0.60–0.80 |
| Oxygen | 0.10–0.30 |
| Nitrogen | 0.55–0.75 |

A powder meeting these specifications is sold by General Dyestuff Corp. as their type E. It will be apparent to those skilled in the magnetic recording art after reading the present specification, however, that other comminuted magnetic materials such as certain oxides of iron are operable according to my invention.

When a given portion of the perimetric surface 2 of drum 3 passes recording head 6 when recording head 6 is momentarily energized, that portion of surface 2 is magnetized according to the flux pattern emanating from recording head 6. When surface 2 is rotated under hopper 8, a layer of comminuted magnetic material is distributed across the surface of the drum. The particle density on the magnetized portion of the drum surface is appreciably greater than that on the unmagnetized portions. I may prefer to provide a wiper 9 to distribute the layer of magnetic material with a uniform thickness on surface 2. To assist in providing uniform distribution, wiper 9, preferably of felt, may be secured to the trailing edge of hopper 8 as by a suitable clamp 8*a*. The lower end of wiper 9 may be shaped as shown to provide a space adjacent medium 10*a* where particles from hopper 8 collect for more even distribution. Wipers may also be provided along the sides of hopper 8 adjacent the edges of material 10*a*, if desired, and a wiper at the leading edge of the hopper may be used to further confine the particles.

Further in accordance with my invention, I provide means for bringing the material to be printed into intimate, substantially rolling contact with surface 2. In the embodiment of Fig. 1, I have illustrated how a roll of paper or other suitable material may be guided from a supply reel 10, around idler pulley 11 supported on tensioning arm 12, over idler pulley 13 and between capstan 1 and surface 2 of the drum 3. When the paper from reel 10 is brought into contact with surface 2 by capstan 1, a substantial portion of the powder adhering to drum surface 2 by reason of having passed under hopper 8, is transferred to the lower surface of the paper. The pattern impressed on drum surface 2 by head 6 is reproduced much more darkly, by reason of greater particle density, than the powder transferred from the unmagnetized portions of the drum surface. Consequently, the paper bears a dark image of the magnetized portion of the drum surface, against a very light gray background. Where the comminuted magnetic material and the material to be printed have optimum characteristics, this light gray background may be virtually nonexistent, but in any case I have found that the contrast ratio between the image and non-image portions of the printed material may be made satisfactorily high.

After leaving the contact area between capstan 1 and surface 2, the paper may be led over such idler pulleys as 14 and 15, and thence wound on a supply reel 16 which is driven in the take-up direction by a reel motor 17. I prefer that the material to be printed have powder fixing properties; that is, that it be able to hold a substantial portion of the comminuted magnetic material transferred to its surface without smudging. I prefer that the material to be printed be coated or impregnated with wax or paraffin, for example before use, and that pulley 14 be heated sufficiently to melt the wax at least to a point where a substantial portion of the transferred magnetic material is bound to the surface of the paper or like material. It can be appreciated by those skilled in the art that pulley 14 may be heated by any convenient means, such as an electrical heating coil 105 in its interior fed from a convenient power source, such as battery 106, in any suitable manner. Alternatively, the paper or like material may be heated by radiant heat, as from an infrared lamp. Those skilled in the art can further appreciate that very little wax is required on the paper to embed, or at least secure, the particles of the comminuted magnetic material against dislodgment. In fact, the amount of wax impregnation required in paper, if that is the material to be printed, is so slight as to be virtually imperceptible to the touch. My invention is not limited to the use of wax or paraffin, of course, since any material having suitable adhesive properties may be employed. By "adhesive" properties, I mean that the surface of the material to be printed is such as to retain a substantial proportion of comminuted material, i. e., sufficient particles to enable satisfactory reproduction of the matter to be printed. While wax or paraffin impregnated paper is specifically mentioned above, other suitable materials will occur to those skilled in the art. For example, a suitable base material may be sized with a substance that reacts chemically with the carbonyl iron to fix and, if necessary, intensify the iron particles (with or without heat pressure, as may be necessary). In some cases, a rough-fibered material may perform satisfactorily without impregnation or other treatment. If heat is not required, the heating means, such as pulley 14, may be omitted.

When the magnetized portion of surface 2 leaves the area of contact with the material to be printed, it may subsequently be passed under a vacuum cleaner comprising a pick-up hood 18, an exhaust blower assembly 19 and a storage container 20. The attractive force of the vacuum presented by hood 18 to the surface 2 serves to remove any untransferred portion of the particles earlier deposited on the surface 2 by hopper 8. Storage container 20 retains the removed particles for future use in hopper 8. Again, those skilled in the art can appreciate that means other than a vacuum cleaner for removing the untransferred particles of comminuted magnetic material may be employed without departing from the spirit and scope of my invention.

After removal of the untransferred particles from the drum surface, the magnetized portion of the drum surface 2 may be magnetically erased, as by means of a suitable erase head 21 which may be energized from energizing source 22. Since erase heads are well known to those skilled in the magnetic recording art, it is not deemed necessary to expound the subject herein.

It is particularly to be pointed out that the magnetized portion of perimetric surface 2 need not necessarily be erased as the magnetized portion passes erase head 21; if desired, source 22 may be disconnected (as by means of a switch, not shown, or by disconnection of conductors), in which case the magnetized portion of surface 2 may again be carried to hopper 8 for deposit of particles in accordance with the magnetic pattern for subsequent printing on a new part of the paper roll, the roll being later cut into page-size sheets if desired. Any number of copies of a given magnetic pattern may thus be printed. From the foregoing description, it is apparent that drum 3 may be constructed with a surface 2 wide enough to print a full width page of any desired size. Similarly, material to be printed from top to bottom on a page may be magnetically impressed on the drum, using the entire surface in the circumferential direction. Any number of copies of the material to be printed may thus be run off merely by inactivating sources 7 and 22. As soon as the desired number of copies has been printed, the drum surface may be quickly and easily readied for another run of different content merely by re-energizing erase head 21 through reconnection of source 22.

It will be apparent to those skilled in the art that magnetic media other than drums may be employed in the practice of the printing method I have invented. For example, the magnetic patterns to be printed may be stored on a reel of magnetic recording tape until such time as printing is desired. Alternatively, an endless belt of magnetic tape may be substituted for magnetic drum 3; the particular configuration of apparatus for carrying out such an embodiment of my invention would depend upon such factors as size and shape of the space available and the form of material to be printed, and would readily be executed by those skilled in the art. It is only necessary, broadly speaking, to have a source of magnetic flux with a surface of flux emanation contoured according to the pattern it is desired to print; to distribute carbonyl iron powder or other suitable comminuted magnetic material over the surface; and to press the powdered surface into contact with the material to be printed.

While it is desirable that printing according to my invention be carried out by the completely dry process I have described, my invention may also employ wet dispersions of comminuted magnetic material in place of the dry material. For example, carbonyl iron powder may be suspended in methyl alcohol. This suspension may be brought into contact with the surface of the magnetic medium, such as surface 2, in which case the magnetic pattern impressed on the medium attracts the particles in the liquid while substantially no particles are deposited on the unmagnetized portions. When printing is done according to this embodiment of my invention, the material to be printed becomes more or less wet and must subsequently be dried, as by a heating coil such as 105. However, the use of liquid dispersions, rather than dry magnetic powder, may have the advantage of producing a higher contrast ratio between the printed pattern and the background transferred to the paper or like material.

As previously explained, I arrange a magnetic recording head to produce a magnetic image of the pattern to be printed. By providing the head with a plurality of elements, each of which may be energized independently of the others, I am able to form a variety of symbols or characters, such as numerals and letters of the alphabet.

Figure 2:
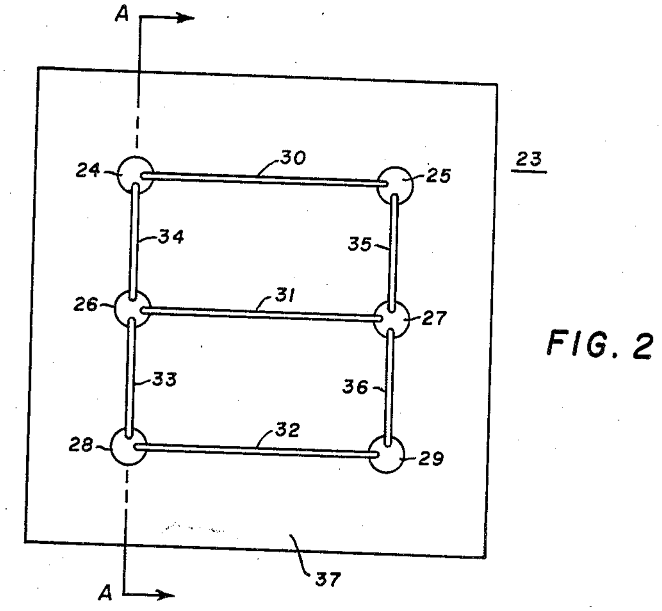
Fig. 2 is a plan view of a recording head suitable for use in the embodiment of my invention shown in Fig. 1.

The magnetic recording head whose plan view is shown in Fig. 2 may be employed, according to my invention, to print Arabic numerals from 0 to 9. This head may consist of a block of insulating material 23 having holes 24—29 drilled therein. Passed through these holes are single U-shaped loops of insulated wire, designated by reference numerals 30—36, these loops constituting flux generating elements arranged in a matrix. The adjacent block portions provide means for supporting these elements.

Figure 3:
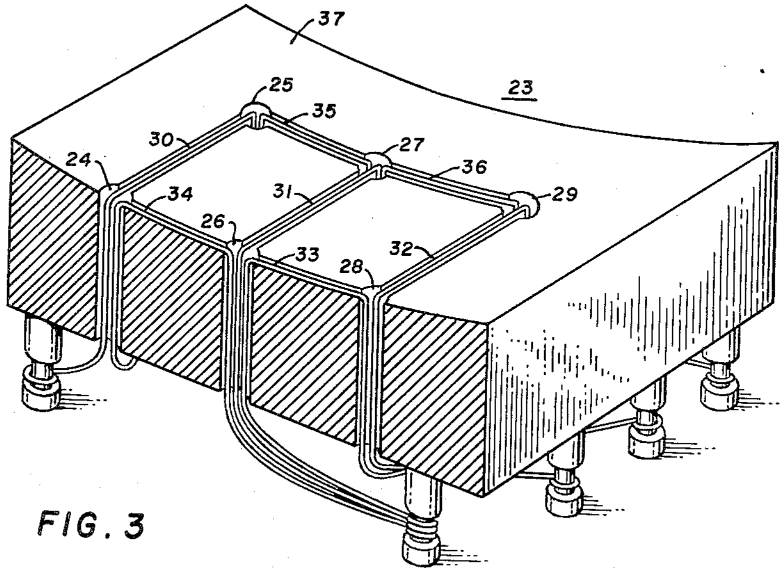
Fig. 3 is an isometric, sectional view of the recording head of Fig. 2, taken along the line A—A of Fig. 2.

The construction is made clear in the isometric view, Fig. 3. The loops of wire may terminate in a plurality of terminal studs, the latter being embedded in insulating material. These studs and the portions of the block adjacent the elements provide means for supporting the elements in fixed relationship relative to each other. The upper face 37 of block 23 is preferably formed with a cylindrically concave surface having a radius of curvature only slightly greater than that of drum 3 and the bottom portions of the U-shaped loops are contoured according to the contour of the magnetic medium in the region adjacent thereto. While not necessary to my invention, I prefer that the face 37 of block 23 have grooves formed therein to receive each of the wire loops and thus present a flush surface.

The numerals which may be produced by the magnetic recording head shown in Figs. 2 and 3 are illustrated in Fig. 4. The numeral 1, for example, may be produced by energizing only elements 35 and 36, while the numeral 8 is produced by energizing all elements of the head simultaneously. It is to be noted that the character-forming elements must be energized in a normal order from left to right as viewed in Fig. 3, since the magnetic pattern produced on the perimetric surface 2 of drum 3 must be a mirror image in order to produce a properly oriented image on the material to be printed. This is true only of printing conventional symbols representing intelligence, such as numerals and letters, and would not necessarily be true, of course, of arbitrarily chosen symbols and pictures.

Inasmuch as drum 3 is continuously rotated when this embodiment of my invention is in use, it is desirable that an image be transferred from magnetic recording head to the surface 2 of the drum with a minimum of "blurring." That is, the selected individual elements of head 6, such as the loops of wire illustrated in Fig. 3, must be energized for a very short duration of time to cause the emanation of magnetic flux. It can be appreciated by those skilled in the magnetic arts that the loops of wire constitute flux generating elements and that these elements must have low impedance if the flux emanating from them is to cease quickly after the current flow stops. I therefore prefer that the loops of wire employed in the head of Fig. 3 consist of a single turn, or at most only a few turns, although I by no means wish to limit myself thereto.

In order to provide quick energization and fast decay of the individual elements of the magnetic recording head, I prefer to employ an energizing circuit which involves discharging charged capacitors through the conductive loops of head 6. In general, it is necessary to provide one such capacitor, or other electrical storage means, for each element of the magnetic recording head. Switches or keys could be depressed simultaneously to energize the corresponding head elements simultaneously and so produce a desired numeral.

While the foregoing method energizes individual elements of the head simultaneously to form desired symbols, I may prefer that the apparatus diagrammed in Figs. 5 and 6 be employed instead. The former of these figures shows the wiring diagram of a keyer unit having one key for each of the symbols (0–9 in the embodiment under discussion) capable of being printed. Fig 6 shows a wiring diagram of a "translator" which energizes the proper combinations of head elements in response to the depression of keys in the keyer unit. The translator comprises a unidirectional source of voltage having terminals indicated by reference symbols (+) and (−), current limiting resistors 38—44, capacitors 45—51, series resistors 52—58, and keying relays 59—65.

To print the figure "1," an operator depresses key 66 (Fig. 5), corersponding to that figure. A circuit for energizing relay 59 may then be traced in Figs. 5 and 6 from (−), key 66, lead 67, winding of relay 59 to (+). Capacitors 45—51 are charged through resistors 38—44, respectively. Upon energization of relay 59, circuits are completed for discharging capacitors 48 and 49 through elements 35 and 36, respectively, of head 6. These circuits may be traced from (−), element 35, resistor 54, contacts 68 of relay 59, capacitor 49 to (−); and (−), element 36, resistor 55, contacts 69 of relay 59, capacitor 48 to (−). Similar circuits can be traced when other keys are depressed to produce other numerals.

It will be noted that only seven relays are required to produce all ten numerals. This is possible because a 6 may be produced by combining a 5 and a 1, for example; an 8 may be produced by combining a 1 and a 3; and a 9 may be produced by combining a 3 and a 4. Other combinations of element energizations are possible, of course. Furthermore, it is obviously possible to employ a single capacitor and to use the relays only to make up the desired combination of head elements before discharge of the capacitor through those elements.

An extension of the principles herein expounded allows letters of the Roman block alphabet to be produced in addition to Arabic numerals. Fig. 7 shows one possible configuration for accomplishing this purpose. The letter "W," for example, may be produced by energizing elements 70—77. The formation of the remaining characters of the alphabet is indicated in Fig. 8. Construction of a head of this type is preferably like that of the head shown in Fig. 3, and the circuits for independently energizing the various elements preferably constitute an extension of the principles involved in the circuit of Fig. 6. A translating circuit for the head indicated in Fig. 7 is not treated in detail herein, since this circuit is only one of a number which will readily occur to those skilled in the art.

It is apparent that printing in accordance with my invention is not limited to keyboard actuation since the translator relays may be energized by any convenient means such as a perforated tape reading machine. Nor do I wish myself to be limited to a translator employing relays; as those skilled in the art are aware, vacuum tubes, transistors and the like, may readily be employed in a translator, using principles well-known in the art.

By way of further illustration, I wish to point out that intelligence to be recorded may be formed using elements other than straight lines. For example, letters and numerals may be formed on a dot basis. A dot matrix, or block, composed of 5 dots in width and 5 dots in height, for example, is capable of producing easily recognizable letters and numerals, as indicated in Fig. 9.

The construction of a dot-matrix magnetic recording head in accordance with my invention may be as indicated in Fig. 10. Each of the dots is produced by an element including a central core, such as 78, which receives its flux from a conductive winding (e. g., 79) on the core. One end of the core (e. g., 80) comprises a pole face from which magnetic flux emanates when the winding is energized. The windings of the head may be energized by the capacitor-discharge circuit disclosed above. As with the straight-line head shown in Figs. 2 and 3, the dot elements in the embodiment of the head shown in Fig. 10 are preferably embedded in a mass of insulating material such as plastic, the surface 81 of the head having a flush contour with a concave curvature located for recording relative to the magnetic medium. Where a drum is used, the curvature is dimensioned in accordance with the radius of drum 3.

My invention lends itself admirably well to the printing of an entire line of characters with one passage of the magnetic recording medium past the hopper, or source, of comminuted magnetic material. If the recording medium is a drum, such as 3 in Fig. 1, the printing of such a line may be made to occur in a single revolution of the drum. To accomplish line printing, it is necessary only to place a number of multi-element matrix heads side by side in a transverse direction across the medium, the number of heads being equal to the number of characters it is desired to print in the line. The magnetic recording medium need only be as wide as the area covered by the matrices of the heads. With this arrangement, the energization of each head is controlled by an individual energizing circuit, which may be of the type disclosed in Figs. 5 and 6.

Where it is desired to print an entire line during a single passage of the medium past the iron powder source and printing contact area, it may prove costly and cumbersome to provide energizing circuits individual to the heads, particularly if a large number of heads is provided for the printing of a long line. The embodiment of my invention indicated in Figs. 11 and 12 minimizes the number of heads required. In Fig. 11, I have shown six heads, numbered 81–86 inclusive, arranged to print a six-character line. The elements of these heads may be conveniently supported or disposed helically along a line extending or winding about the drum in the direction of rotation thereof by a single block of plastic 87 or may be individually formed as shown in Fig. 3, which may in turn be supported by any suitable means which can easily be designed by those skilled in the art. I have illustrated heads 81–86 as being of the figure-8 type of matrix, although other types of matrices, such as those shown in Fig. 7 and Fig. 9, may be used instead. The face 88 of block 87 may have a concave-upward contour according to the radius of the magnetic drum whose position is indicated by dashed lines 89 and 90. If a magnetic medium other than a drum were used, face 88 would be contoured like the medium, the criterion being that each element of each head should be located for recording relative to the medium.

The manner of connecting a single energizing circuit to the heads of a line-printing arrangement such as that of Fig. 11 is indicated in Fig. 12. An energizing circuit, which may be of the type indicated in Figs. 5 and 6, is here indicated in block diagram form as comprising a source of potential 91, a translator 92 and a keyer 93.

The output of the translator is indicated by lead 94, although it will be understood, in the light of the earlier explanation, that the translator output comprises at least one lead for each element present in a given type of head.

In this embodiment of my invention, I provide a switch comprising arm 95 and contacts 96–101, inclusive, which lead to heads 81–86, respectively. Switch arm 95, it is to be understood, is a representation of multiple switch arms, the number of arms required being dependent on the number of elements present in the type of head used. With the figure-8 type of matrix shown in Fig. 11, the switch arm indicated generally as 95 represents seven switch arms, each carrying current intended for individual ones of the elements of a given matrix at a time. Likewise, contacts 96–101 each stand for seven contacts which individually feed the seven elements of each of heads 81–86. A schematic representation has been employed in Fig. 12 to avoid confusion which would result if an attempt were made to diagram all individual connections. The manner of connection is believed obvious from the foregoing explanation.

In accordance with my invention, I arrange for switch arm 95 to be driven over contacts 96–101 by means of any convenient prime mover whose speed may be synchronized with that of the magnetic medium, in this case of the drum indicated by lines 89 and 90 in Fig. 11. Further in accordance with my invention, I arrange for the speed of switching of arm 95 from one contact to the next to correspond to the advance of successive heads to a given position. Thus, the amount of angular displacement of the helical line from the transverse direction of the perimetric surface of the drum should be proportional to the rotational speed of the drum and to the switching speed of the switch means so that a straight-line transverse line of recorded images results. Thus, head 81, for example, may be energized from the translator 92 via switch arm 95 and contact 96; when a transverse line on the drum passing through the center of head 81 at its time of energization is rotated until it is above the center of head 82, switch arm 95 will have reached contact 97, thus energizing head 82; and so on for the remaining heads. In this way, the characters impressed by heads 81–86 on the perimetric surface of the drum lie on a line substantially transverse of the drum perimetric surface, and consequently will be simultaneously printed as a single line when the imaged portion of the drum comes in contact with the material to be printed.

The arrangement of Fig. 11 may be summarized by pointing out that the centers of heads 81–86 have their centers lying on a line 102 which is positioned at an angle 103 to a transverse line 104, the size of angle 103 being dependent on the speed of the recording drum and the speed of switching. As will be obvious to those skilled in the art, the means for driving switch arm 95 may be the same as the means for driving the recording medium.

While I have shown and described my invention as applied to a specific embodiment thereof, other modifications will readily occur to those skilled in the art. For example, while multiple element heads have been shown, a plurality of physically distinct heads may be used for each symbol, character, or other intelligence to be reproduced. Moreover, while I have illustrated heads comprising a plurality of elements which may be combined in various combinations, thereby minimizing the number of elements necessary to the complete alphabet and the ten numerals 1–0, a single turn can be disposed in any fashion and configuration, as by printed circuit technique, for example, and the pole faces of the magnetic recording heads may be contoured in any desired fashion or shape to represent the desired symbol, letter, numeral, picture, or other intelligence to be recorded and reproduced. While the heads 6 and 21 are shown engaging the surface of the magnetic medium, the heads need not engage if engagement is not desired. I do not, therefore, desire my invention to be limited to the specific arrangements shown and described, and I intend in the appended claims to cover all modifications within the spirit and scope of my invention.

What I claim is:

1. In a magnetic printing apparatus, the combination of a magnetic recording medium; a plurality of magnetic recording heads; means for continuously transporting said medium past said heads; each said head having a plurality of magnetic flux generating elements arranged in a matrix capable of defining, upon the selective energization of said elements, any one of a group of characters, said heads being disposed along a line through their centers, said line being contoured according to the contour of said medium in the region adjacent thereto; means for selectively energizing said elements of one head at a time; and means for sequentially switching said last-named energizing means from the elements of one head to those of another; said line being displaced from the transverse direction of said medium in the direction of said transport by an angular amount proportional to the speed of said transport and the switching speed of said sequential switching means, whereby a magnetic image of a line of said characters may be stored on said medium, said line of characters extending substantially in said transverse direction across said medium.

2. In a magnetic printing apparatus, the combination of a magnetic drum arranged for rotation about a central axis; means for continuously rotating said drum; a plurality of magnetic recording heads; each said head having a plurality of magnetic flux-generating elements arranged in a matrix capable of defining, upon the selective energization of said elements, any one of a group of characters, said heads having their centers disposed along a line winding helically about said drum in the direction of rotation thereof, each said head being positioned for recording relative to the perimetric surface of said drum; means for selectively energizing said elements of one head at a time; and means for switching said last-named energizing means from the elements of one said head to those of another said head in sequence along said line in the direction of drum rotation, the amount of angular displacement of said helical line from the transverse direction of the perimetric surface of said drum being proportional to the rotational speed of said drum and to the switching speed of said switching means, whereby a magnetic image of a line of said characters of said group may be stored on the perimetric surface of said drum, said line of characters extending substantially in said transverse direction across said perimetric surface.

3. In a magnetic printing apparatus, the combination of a magnetic recording head having a plurality of magnetic flux-generating elements arranged in a matrix capable of defining, upon selective actuation of said elements, any one of a group of characters; an electrical storage condenser individual to each said elements; a source of potential; means for charging said storage condenser from said source of potential; means for connecting individual ones of said charge storage condenser to the elements of said head corresponding thereto; and control means for actuating said last-named connecting means; said control means being arranged to actuate various combinations of said connecting means to cause the emanation of flux patterns from said elements corresponding to the characters of said group.

4. In a magnetic printing apparatus, the combination of a magnetic recording head having a plurality of magnetic flux-generating elements arranged in a matrix capable of defining, upon selective actuation of said elements, any one of a group of characters; electrical storage condensers; a source of potential; means for charging said storage condensers from said source of potential; means for connecting said storage condensers to various combinations of said elements corresponding to said characters of said group; and control means for controlling the actuation of said last-named connecting means, thereby to cause emanation of flux patterns from said elements corresponding to the characters of said group.

References Cited in the file of this patent

UNITED STATES PATENTS

| | | |
|---|---|---|
| 1,028,037 | Lilleberg | May 28, 1912 |
| 1,116,949 | Stille | Nov. 10, 1914 |
| 1,590,399 | Tykociner | June 29, 1926 |
| 1,917,509 | De Ybarrondo | July 11, 1933 |
| 1,974,911 | Buecker et al. | Sept. 25, 1934 |
| 2,035,475 | Hay | Mar. 31, 1936 |
| 2,200,741 | Gray | May 14, 1940 |
| 2,221,776 | Carlson | Nov. 19, 1940 |
| 2,236,373 | Kowalski | Mar. 25, 1941 |
| 2,248,522 | Conrad | July 8, 1941 |
| 2,258,106 | Bryce | Oct. 7, 1941 |
| 2,427,421 | Rieber | Sept. 16, 1947 |
| 2,511,121 | Murphy | June 13, 1950 |
| 2,530,564 | Blaney | Nov. 21, 1950 |
| 2,533,326 | Putt | Dec. 12, 1950 |
| 2,540,654 | Cohen et al. | Feb. 6, 1951 |
| 2,551,582 | Carlson | May 8, 1951 |
| 2,554,835 | Mallina | May 29, 1951 |
| 2,561,476 | Lang | July 24, 1951 |
| 2,594,731 | Connolly | Apr. 29, 1952 |
| 2,608,346 | Hopkins | Aug. 26, 1952 |
| 2,624,652 | Carlson | Jan. 6, 1953 |
| 2,627,413 | Frisch et al. | Feb. 3, 1953 |
| 2,629,827 | Eckert et al. | Feb. 24, 1953 |
| 2,657,932 | Blaney | Nov. 3, 1953 |
| 2,715,360 | Brown | Aug. 16, 1955 |

FOREIGN PATENTS

| | | |
|---|---|---|
| 537,343 | Great Britain | June 18, 1941 |

OTHER REFERENCES

Jones: Printing by Magnetism, Pub. 1839 in Mechanics Magazine, vol. 31, No. 835, at page 342.

Murphey et al.: Head Alignment With Visible Magnetic Tracks, Audio Engineering for January 1949, pages 12, 13, 38 and 39.

Atkinson et al.: Ferrography, November 1951 issue of Journal of the Franklin Society, vol. 252, No. 5, pages 373 to 381.

Berry et al.: Ferromagnetography—High Speed Printing With Shaped Magnetic Fields, General Electric Review for July 1952, pages 20, 21 and 61.